F. LAMBERT.
FLUID METER.
APPLICATION FILED OCT. 9, 1916.

1,331,159.

Patented Feb. 17, 1920.
3 SHEETS—SHEET 1.

WITNESSES:
R. Richardson
May I. Trimble

INVENTOR.
Frank Lambert
BY
H. M. Marble
ATTORNEY

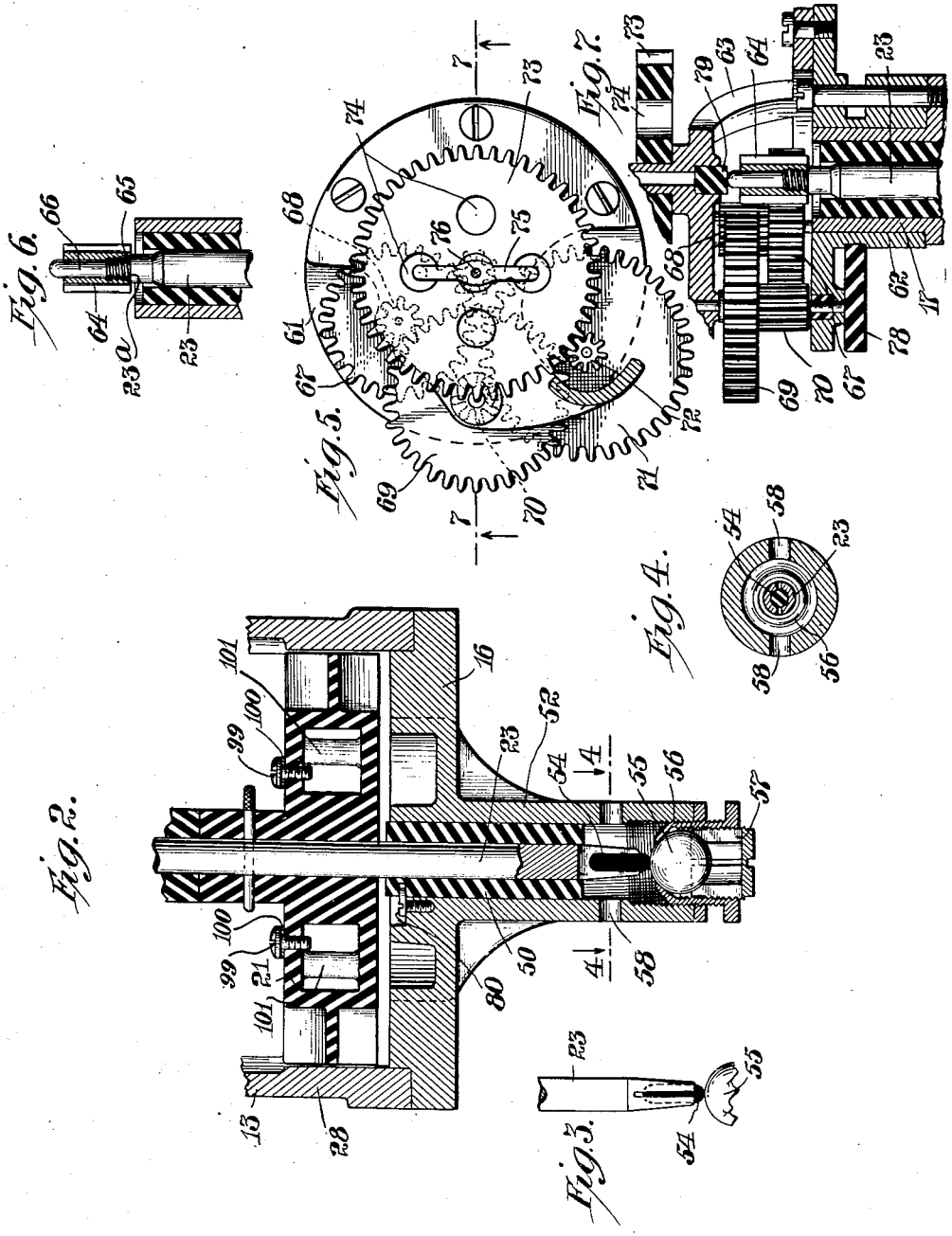

F. LAMBERT.
FLUID METER.
APPLICATION FILED OCT. 9, 1916.
1,331,159.
Patented Feb. 17, 1920.
3 SHEETS—SHEET 3.
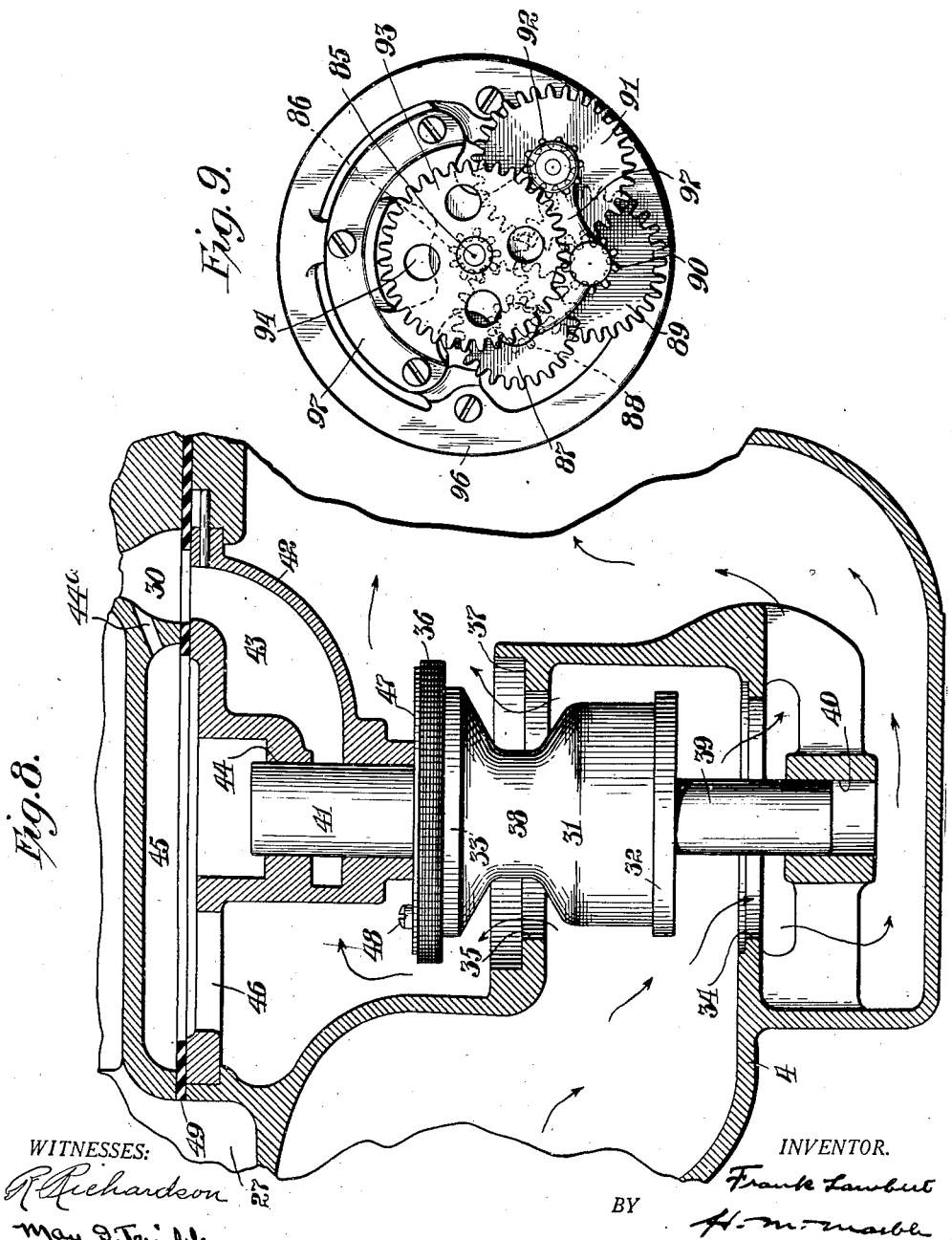

UNITED STATES PATENT OFFICE.

FRANK LAMBERT, OF BROOKLYN, NEW YORK.

FLUID-METER.

1,331,159.  Specification of Letters Patent.  Patented Feb. 17, 1920.

Application filed October 9, 1916. Serial No. 124,440.

*To all whom it may concern:*

Be it known that I, FRANK LAMBERT, a citizen of the United States of America, and a resident of the borough of Brooklyn, city of New York, county of Kings, and State of New York, have invented a certain new and useful Fluid-Meter, of which the following is a specification.

My invention relates to improvements in meters for measuring the flow of fluids, particularly liquids, and to that class of such meters, termed duplex meters, which comprises two meters, one designed for the accurate measuring of low flows, the other for the accurate measuring of higher flows, together with suitable valve means for cutting off the low rate of flow meter, and cutting in the high rate of flow meter, when the flow rate exceeds a predetermined value, and for cutting in the low rate of flow meter and cutting out the high rate of flow meter when the rate of flow falls below a predetermined value. My invention comprises an improved current meter designed for operation at high rates of flow; an improved step-bearing for meter rotors, particularly the rotor of the current meter; an improved rotor shaft having a removable and reversible bearing tip; an improved arrangement of bearings for the shaft of the meter rotor; an improved relative arrangement of the meter rotor shaft and of the pinion of the gear train driven by that shaft; an improved valve for cutting in and out the lower and higher rates of flow meters; a novel sluice ring; an improved arrangement of flow passage in connection with the lower rate of flow meter; and other features, all as hereinafter described and particularly pointed out in the appended claims.

The objects of my invention are generally to improve fluid meters, particularly duplex meters, and to render the same adaptable for use under commercial conditions of the most trying character. Other objects of my invention will appear hereafter.

I will now proceed to describe my invention with reference to the accompanying drawings, and will then point out the novel features in claims. In said drawings:

Fig. 2 shows a fragmentary axial section of a portion of the rotor of the current meter and associated parts.

Fig. 3 shows a fragmentary elevation of the lower portion of the shaft of the current meter and the bearing ball upon which that shaft rests.

Fig. 4 shows a transverse section taken on the line 4—4 of Fig. 2.

Fig. 5 shows a top view and partial section of the gear train of the current meter and associated parts.

Fig. 6 shows a fragmentary elevation of the upper portion of the shaft of the current meter, the upper portion of the bearing for such shaft being shown in axial section.

Fig. 7 shows a central vertical section of the gear train of the higher rate of flow meter, or current meter, and associated parts, the section being taken on the line 7—7 of Fig. 5.

Fig. 8 shows, on a larger scale than Fig. 1, a central vertical section of the valve and associated parts for cutting in and out of action the lower and higher rates of flow meter.

Fig. 9 shows a top view of the gear train of the lower rate of flow meter.

Figure 1:
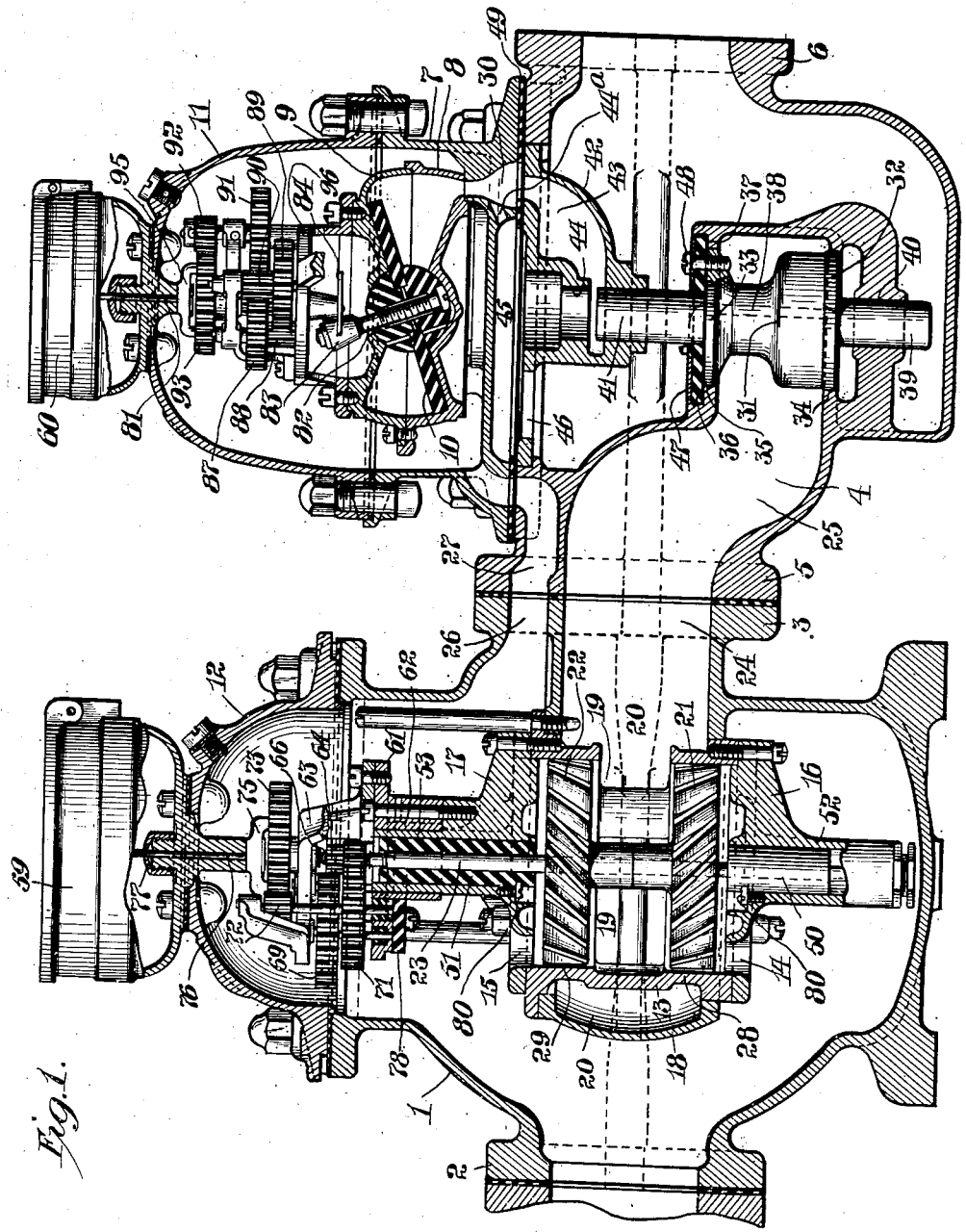
Figure 1 shows a longitudinal section of my improved duplex meter.

Referring first to Fig. 1, numeral 1 designates the casing of the higher rate of flow meter, such casing having an inlet spud 2 and an outlet spud 3. 4 designates the valve casing, having an inlet spud 5 and an outlet spud 6. 7 designates a casing mounted upon the valve casing 4, and inclosing within it the two part casing 8—9 of the lower rate of flow meter, which latter meter is of the ordinary nutating disk type; 10 designating the nutating-disk piston of this latter meter. 11 designates a bonnet for casing 7, and 12 designates a bonnet for casing 1.

The higher rate of flow meter, or current meter, comprises a rotor chamber, 13, located within casing 1, and with free flow space around it leading to ports 14 and 15 in bottom and top heads 16 and 17 respectively, for the chamber 13; chamber 13 being supported by a bracket 18, integral with and projecting inwardly from the walls of casing 1. Rotor chamber 13 has large ports 19 communicating with the discharge space 20. Within this rotor chamber 13 are two bladed rotor wheels 21 and 22 of opposite pitch, mounted upon the same rotor shaft 23, and arranged to impart motion to that shaft. It will be seen that fluid, entering through the spud 2, surrounds bracket 18 and enters chamber 13 upwardly through port 14 (and so acting upon the blades of wheel 21) and downwardly through port 15

(and so acting upon the blades of the wheel 22); the fluid which has acted upon these two wheels passing into the space between such two wheels and then outward through the main port 24 of spud 3 into the flow passage 25 of valve casing 4. Such flow occurs when the valve (hereinafter mentioned) within such valve casing, is open. At other times, i. e., when such valve is closed, the fluid flowing through the casing 1 passes out through a secondary port 26 in the outlet spud 3, into another flow passage 27 of the valve casing 4, and then actuates the nutating disk meter, as hereinafter described. Rotor chamber 13 has portions 28 and 29, surrounding rotor wheels 21 and 22 somewhat closely and causing the fluid entering through ports 14 and 15 to pass between the blades of those wheels with a minimum of "slip", thereby causing such wheels to rotate in substantial proportion to the rate of flow of the fluid past them. The motion thus communicated to wheels 21 and 22 is in turn communicated, through shaft 23, and a gear train hereinafter described, to suitable registering mechanism. The nutating disk meter of which 8—9 constitutes the casing and 10 the disk, is in itself well known and needs no particular description here. It suffices to say that at low rates of flow, when the valve (hereinafter mentioned) within casing 4 is closed, fluid enters the casing 8—9, through an inlet port not shown, from the space surrounding this casing 8—9, and actuates the disk 10, such fluid being then discharged through a port 30; whence, as hereinafter described with relation to the action of the valve within casing 4, such discharged fluid reaches the outlet of the casing 4. The disk 10, in its nutation, operates a suitable gear train, whereby a suitable registering mechanism is operated, as hereinafter described.

The valve mechanism within casing 4 comprises a valve proper, 31, of the piston type, having two piston portions, 32 and 33, arranged to fit closely within valve ports 34 and 35, respectively, and having, further, a cushion plate 36, of larger diameter than piston portions 32 and 33 and adapted to rest upon a valve seat 37. The valve ports 34 and 35 are in webs of the casing 4, separating the inlet side of that valve casing from the outlet side thereof; and when the valve ports 34 and 35 are open, fluid may flow freely from the inlet side of the valve chamber 4 to the outlet side thereof; valve 31 having a constricted portion 38 to facilitate such free flow through the port 35 when the valve is in the elevated position shown in Fig. 8. Valve 31 has a lower guide stem 39, working in a suitable bearing 40 of the casing 4, and has also an upper guide stem 41 working in a suitable guide in the "sluice ring" 42, hereinafter mentioned. By these stems the valve is guided in such manner as to move very freely. Measurement will show that the piston portion 33 of the valve is of slightly greater diameter, than the piston portion 32; from which fact it follows that when fluid pressure in the inlet side of the casing 4 is sufficient to overcome the weight of the valve, the valve 31 will lift slightly; and then, as such fluid pressure acts upon the bottom surface of cushion plate 36, which plate is of greater diameter than piston portion 33, the valve will rise still higher, and will remain elevated so long as there is sufficient flow through port 35 to overcome the weight of the piston 31. As above stated, the discharge from the nutating disk meter 8—9—10, is through a discharge port 30. This discharge port communicates with a passage 43, in sluice ring 42, leading to a valve port 44 and thence (when such valve port is open) to a passage 45 in the sluice ring having an outlet 46 into the discharge side of the valve casing 4. When valve 31 is in its elevated position, its upper stem 41 closes the port 44, and so prevents operation of the lower rate of flow meter, 8—9—10, except as hereinafter stated. But when, as shown in Fig. 1, the valve 31 is down or in its closed position, then stem 41 no longer closes port 44 and there is free opportunity for flow from discharge port 30 of meter 8—9—10, through port 44, passage 45 and outlet 46, and thence through the discharge outlet of spud 6.

It will thus be seen that the valve 31 shuts off the flow through the higher rate of flow meter (of which 21 and 22 are the rotor wheels) but at the same time permits flow through the low rate of flow meter (of which 10 is the piston), when the rate of flow is not sufficient to raise the valve 31 against its own weight; but when the rate of flow is sufficient to raise that valve 31 slightly, as that valve rises the pressure of the water on the inlet side of the valve is communicated to the cushioning plate 36; which plate, then acting as a further piston, raises the valve still farther, permitting free flow through the high rate of flow meter, and substantially cutting off flow through the low rate of flow meter, by the valve action of spindle 41 in port 44.

The cushioning plate 36, which is commonly formed of hard rubber, not only acts as an auxiliary piston of the valve, but also acts as a cushion for the valve, when seating of the latter occurs; and furthermore, this plate 36, by seating on the shoulder 37, or valve seat, forms a tighter closure than would the piston 33 by itself, for such piston 33 must necessarily have some clearance with respect to its port 35. While the current meter or high rate of flow meter, of which 21 and 22 together constitute the rotor, is a very free-running meter, yet with the disk 36 seated, leakage, if any, between such disk 36 and its seat 37, and leakage, if any, between valve piston 32 and its port 34, will be too small to cause rotation of such rotor 21—22. It is not desirable that the low rate of flow meter shall come absolutely to rest, when this can be avoided, because it requires slightly more flow to start this meter in operation, once it has come to rest, than is required to continue it in operation. Hence a small by-pass port 44ª, is provided, leading direct from discharge port 30 of the low rate of flow meter to passage 45. Since the total flow is determined by reading the registering devices of both the high rate of flow meter and the low rate of flow meter, and adding the totals, the small amount of the fluid passing through this port 44ª while valve 31 is elevated, does no harm, and is registered so as to appear in the total.

The cushioning plate 36 is removably secured to the valve 31 by means of a top plate 47 and screw 48. Being readily removable, it may be replaced when necessary. The sluice ring 42 is located, as will be seen, in a suitable seat in the top of the valve casing 4; and being so seated, is accurately centered so that the axis of its port 44 is accurately in line with the axis of the valve ports 34 and 35. A suitable gasket 49 is interposed between valve casing 4 and casing 7; but since this sluice ring is below the gasket, and is clear of the bolts by which the casings 4 and 7 are secured together, the alinement of this sluice ring is not affected by the setting up of the gasket 49, or by the stresses possibly incident to the bolting together of casings 4 and 7.

Returning now to the primary or higher rate of flow meter. As indicated particularly in Fig. 2, the propeller wheels 21 and 22 are usually of hard rubber, and are usually hollow; and in practice the weight of these propeller wheels is such that they tend to float, or at least are just about balanced as to flotation, in the fluid, which the meter is to register. The shaft 23 on which these propeller wheels 21 and 22 are mounted, passes through steady-bearings formed in hard rubber bushings 50 and 51 themselves located in tubular portions 52 and 53 of the bottom and top plate 16 and 17; and, as shown particularly in Figs. 2 and 3, the lower end of the shaft 23 is provided with a socket within which is located a removable and reversible hard rubber tip 54, resting upon a bearing ball 55 located within a hollow socket screw 56 and held in place by an adjustable seat screw 57. It will be obvious that the step-bearing formed by the tip 54, the ball 55, and the seat screw 57, is of such nature as to afford practically the absolute minimum of frictional resistance, the more so as these parts are submerged in the fluid metered (which enters the step-bearing space through ports 58). However, should any detrimental wear of these parts occur, the tip 54 is easily removed, and, when removed, may be reversed and reinserted, thus affording a new bearing end; or, if both ends of this tip be worn, then a new tip may be inserted. The ball 55 will rarely, if ever, require replacement because of wear, as not only is it harder than the rubber tip 54, and therefore less likely to be worn than the tip 54, but also it provides an almost infinite number of bearing spots, which may be placed underneath the tip 54.

The two meters together constituting the duplex meter illustrated and described, are each provided with the usual registering mechanism, which I have not shown, except by the conventional cases 59 and 60, within which it may be understood that the said registering mechanisms are located. Each meter drives its corresponding registering mechanism through a suitable train of gears. The train of gears for the higher rate of flow meter is shown in Figs. 5, 6 and 7. This gear train is supported by a table 61 having a perforate central hub 62 fitting over the central stem-portion of the cover 17; to which table is secured, so as to form practically part of it, a bracket 63. Upon the rotor shaft 23 is mounted the first pinion 64, of the gear train. As shown particularly in Figs. 6 and 7, the upper end of the rotor shaft 23 is screw threaded at 65 to receive this pinion 64, and also has, above its screw threaded portion 65, a cylindrical portion 66; and further, the pinion screws down against a shoulder 23ª of shaft 23. The pinion, being formed accurately to correspond to the portions 65 and 66 of said shaft 23, and being screwed down against said shoulder, is not only held in place, but is accurately centered; a condition essential for smooth operation of the gear train.

This pinion 64 intermeshes with a gear 67, which itself drives a pinion 68 in mesh with a gear 69 which drives a pinion 70 in mesh with a gear 71 which drives a pinion 72 in mesh with a large gear 73 at the top of the bracket 63, and the axis of which is concentric with the axis of the rotor shaft 23. This large gear 73 is provided with the usual perforations 74 to receive the yoke 75 of the shaft 76 which passes through a suitable bearing and through a suitable stuffing box 77 (see Fig. 1) and drives the registering mechanism within casing 59. Because this gear train is supported, as a whole, on the bearing for the rotor shaft 23, and is supported by a tubular portion of the table 61, fitting over a portion of the bearing concentric with the shaft 23, and because the shaft or spindle 76 constituting the final member of this gear train, and which drives the registering mechanism, is also concentric with the shaft 23, the accurate construction of the meter is greatly simplified, as is also the construction of the gear train in such manner that it shall run very smoothly and with minimum friction. It will be understood that in order that such a gear train may run very smoothly or lightly, most accurate location of the centers of the gears carried by the table 61, and most accurate location of the first gear, 67, with respect to the pinion 64, and most accurate location of the final gear 73, with reference to the shaft 76, is necessary. It is of course relatively easy to properly locate the centers of the gears which are on the table 61; the mounting of this table on the bearing tube for the shaft 23 accurately locates that table with respect to such shaft, and thereby locates the gear 67 so that it will be in proper mesh with pinion 64. The fact that the final gear 73 has its axis in line with the axis of shaft 23, makes it easy to locate the bearing for the register-driving spindle 76, so that that spindle will be properly driven by the gear 73.

The arbors for gears 67, 69 and 71 project through suitable bearing apertures in the table 61 and rest against a hard rubber piece 78, which forms a step-bearing for such arbors. I have found that this construction provides, under the conditions under which the arbors operate, a particularly low friction step-bearing.

The bracket 63 is provided with a hard rubber bearing piece 79 which forms a top bearing for the rotor shaft 23, in case the flow of the fluid should cause the rotor to rise sufficiently so that the top of the rotor shaft comes in contact with this bearing piece 79.

The hard rubber bearing bushings 50 and 51 are held in place by screws 80 (Fig. 2) having eccentric heads which are adapted to fit into corresponding notches of the bearing bushings.

The drive for the register-driving spindle 81 of the lower rate of flow meter is as follows:

The disk piston 10 of that meter has, as is customary, a central pin 82 provided with a conical head 83 which engages a cross bar 84 on a shaft 85 (Fig. 9) carrying a pinion 86 which meshes with a gear 87 itself driving a pinion 88 which meshes with a gear 89 driving a pinion 90 which meshes with a gear 91 driving a pinion 92 which meshes with a centrally located gear 93 having apertures 94 to receive the yoke 95 on the register-driving spindle 81. The arbors for gears 87, 89 and 91 have lower bearings in a table 96 supported on the top member 9 of the meter casing 8—9, and on this table 96 is supported a bracket 97 in which such arbors have a top bearing and in which also the shaft 85 has a top bearing. The fact that the final gear 93 of the train has its axis concentric with the axis of the shaft 85 and also with register-driving spindle 81 greatly facilitates accurate construction and location of the gears with consequent easy running thereof, for reasons similar to those explained above with reference to the drive of the higher rate of flow meter.

It has been stated that the rotor wheels 21 and 22 are hollow, and are usually of hard rubber. In the process of forming these wheels (which process I do not describe herein, since the process is well known to rubber workers) it is necessary to employ an easily vaporized liquid which, when the wheel is finally completed, remains in the hollow space of the wheel. It is desirable to remove this liquid, in order to lighten the wheel, and balance it better. To that end, a small aperture is formed in the wheel, through which the liquid can be withdrawn, and then this aperture is tapped and a headed screw 99 inserted, there being usually a suitable washer 100 beneath the head of this screw; and in this way the said opening is closed hermetically, and entrance of the fluid to be measured into the hollow space of the wheel prevented. In practice, and in order that the rotor wheel may be in perfect balance, two such holes, and two such screws, are commonly provided, the said holes and screws being diametrically opposite and at equal radial distances from the center of rotation.

Also, and particularly in the case of wheels for large meters, stiffening posts 101 are provided, which posts are commonly integral with the walls of the wheel. These posts are used to prevent collapse of the wheel under high hydrostatic pressure.

In another application for Letters Patent Serial No. 680,837, filed March 1, 1912, now Patent No. 1,253,502, dated Jan. 15, 1918, I have claimed, the combination with a rotor chamber separate from the main casing, of a rotor mounted for rotation within such rotor chamber and also for axial movement therein, and arranged to be held in fluid suspension by the action of the flowing fluid upon it. Therefore such invention is not claimed broadly herein. In the specific structure of my said prior application, upon which the claim referred to is predicated, the rotor itself is not of such weight, in reference to its volume, that in and of itself it is in flotation balance in the fluid flowing through the meter; the said rotor being provided with a member, in the path of the flowing current of fluid, and adapted to be acted upon by that current, to hold the rotor in suspension.

What I claim is:—

1. A duplex meter comprising in combination two meters, one adapted for registering relatively high rates of flow, the other for registering lower rates of flow, said meters having flow passages whereby fluid to be metered may pass through the one meter or through the other, and an automatic valve controlling flow through said meters and comprising differential valve pistons and a cushion plate, controlling flow through the high rate of flow meter, such valve having a seat for the cushion plate against which the latter seats when the valve closes flow through the high rate of flow meter, said valve comprising means for restricting flow through the low rate of flow meter when such valve is open to permit flow through the high rate of flow meter.

2. A duplex meter comprising in combination two meters, one adapted for registering relatively high rates of flow, the other for registering lower rates of flow, said meters having flow passages whereby fluid to be metered may pass through the one meter or through the other, and an automatic valve controlling flow through said meters and comprising differential valve pistons and a cushion plate, controlling flow through the high rate of flow meter, such valve having a seat for the cushion plate against which the latter seats when the valve closes flow through the high rate of flow meter, said valve comprising means for restricting flow through the low rate of flow meter when such valve is open to permit flow through the high rate of flow meter, such cushion plate of greater diameter than the valve pistons of such valve, and constituting means against which the flowing fluid may act to increase the opening of the valve once that valve has begun to open.

3. A duplex meter comprising in combination a meter casing having main inlet and outlet connections and having within it a high rate of flow meter, a valve casing having a main inlet connection in communication with the main outlet connection of said meter casing, and having also a main outlet connection, with valve-ported walls between its said main inlet and outlet connections, a relatively low rate of flow meter, a flow connection leading from the first mentioned meter casing to said low rate of flow meter, a discharge connection leading from such low rate of flow meter to the outlet of said valve casing, a differential piston valve adapted for coaction with the said valve ports of said valve casing, and having also valve means controlling flow through the low rate of flow meter, said valve means arranged in one position to restrict flow through the high rate of flow meter, and to permit flow through the low rate of flow meter, and arranged in another position to permit flow through the high rate of flow meter and to restrict flow through the low rate of flow meter.

4. A duplex meter comprising in combination two meters, one adapted for registering relatively high rates of flow, the other for registering lower rates of flow, said meters having flow passages whereby fluid to be metered may pass through the one meter or through the other, an automatic valve controlling flow through said meters and arranged in one position to permit free flow through the high rate of flow meter, and to restrict flow through the low rate of flow meter, and in another position to permit free flow through the low rate of flow meter and to restrict flow through the high rate of flow meter, and a restricted by-pass around said valve permitting restricted flow through one of said meters when such valve is otherwise restricting flow through that meter.

5. A duplex meter comprising in combination two meters, one adapted for registering relatively high rates of flow, the other for registering lower rates of flow, said meters having flow passages whereby fluid to be metered may pass through the one meter or through the other, an automatic valve controlling flow through said meters and arranged in one position to permit free flow through the high rate of flow meter, and to restrict flow through the low rate of flow meter, and in another position to permit free flow through the low rate of flow meter and to restrict flow through the high rate of flow meter, and a restricted by-pass permitting restricted flow through the low rate of flow meter when said valve is restricting flow through that meter.

6. A duplex meter comprising in combination a meter casing having main inlet and outlet connections and having a meter therein, a valve casing having inlet and outlet connections, the former adapted to register with the main outlet connection of such meter casing, another meter casing mounted upon the valve casing, and a further meter located within such second meter casing, such first mentioned meter casing and the valve casing having communicating ducts adapted to lead fluid from the admission side of the first mentioned meter casing to said second meter casing, a duct leading from the discharge side of the second meter to the discharge connection of said valve casing, and valve means within said valve casing arranged in one position to permit free flow from the first mentioned meter and to restrict flow from the second meter, and in another position to restrict flow from the first meter and to permit free flow from the second meter.

7. A duplex meter comprising in combination a meter casing having main inlet and outlet connections and having a meter therein, a valve casing having inlet and outlet connections, the former adapted to register with the main outlet connection of such meter casing, another meter casing mounted upon the valve casing, and a further meter located within such second meter casing, such first mentioned meter casing and the valve casing having communicating ducts adapted to lead fluid from the admission side of the first mentioned meter casing to said second meter casing, a duct leading from the discharge side of the second meter to the discharge connection of said valve casing, and a restricted by-pass permitting restricted flow through one of said meters when said valve means is restricting flow through that meter.

8. A duplex meter comprising in combination a meter casing and a valve casing, a meter within said meter casing, a second meter casing mounted upon the valve casing and a second meter within such second meter casing, a sluice ring interposed between said valve casing and said second meter casing, the first mentioned meter casing and the valve casing having a main flow passage and having also a second flow passage which leads to the second meter casing, the valve casing having a discharge passage and the second meter and the sluice ring having together a discharge passage leading to the discharge passage of the valve casing, and valve means within said valve casing arranged in one position to restrict flow through the first mentioned meter and to permit free flow from the discharge of the second meter, and in another position to permit free flow from the first mentioned meter and to restrict flow from the second meter.

9. A duplex meter comprising in combination a meter casing and a valve casing, a meter within said meter casing, a second meter casing mounted upon the valve casing and a second meter within such second meter casing, a sluice ring interposed between said valve casing and said second meter casing, the first mentioned meter casing and the valve casing having a main flow passage and having also a second flow passage which leads to the second meter casing, the valve casing having a discharge passage and the second meter and the sluice ring having together a discharge passage leading to the discharge passage of the valve casing, and valve means within said valve casing arranged in one position to restrict flow through the first mentioned meter and to permit free flow from the discharge of the second meter, and in another position to permit free flow from the first mentioned meter and to restrict flow from the second meter, and a by-pass leading from between the second meter and said valve means to the discharge passage of said valve casing.

10. A duplex meter comprising in combination a meter casing and a valve casing, a meter within said meter casing, a second meter casing mounted upon said valve casing, a gasket between said second meter casing and said valve casing, means for securing said second meter casing to said valve casing, a second meter within said second meter casing, a sluice ring interposed between said second meter casing and the meter therein, on the one hand, and the said valve casing, on the other hand such sluice ring seated in a shoulder of the valve casing beneath the said gasket, whereby said sluice ring is supported and centered independently of the gasket and of the means for securing said second meter casing to the valve casing, said valve casing having a discharge connection, said second meter and the sluice ring having together a discharge passage leading to the discharge passage of the valve casing, and valve means controlling flow from the first mentioned meter to the said outlet passage of the valve casing, and also controlling flow from the second meter through the discharge passage of said sluice ring, said valve adapted in one position to permit free flow from the first mentioned meter, and to restrict flow from the second mentioned meter, and in another position to restrict flow from the first mentioned meter and to permit free flow from the second mentioned meter.

11. A duplex meter comprising in combination a meter casing and a valve casing, a meter within said meter casing, a second meter casing mounted upon said valve casing, a gasket between said second meter casing and said valve casing, means for securing said second meter casing to said valve casing, a second meter within said second meter casing, a sluice ring interposed between said second meter casing and the meter therein, on the one hand, and the said valve casing, on the other hand, such sluice ring seated in a shoulder of the valve casing beneath the said gasket, whereby said sluice ring is supported and centered independently of the gasket and of the means for securing said second meter casing to the valve casing, said valve casing having a discharge connection, said second meter and the sluice ring having together a discharge passage leading to the discharge passage of the valve casing, said valve casing having ported partitions in the path of flow from the first mentioned meter to the outlet passage of such valve casing, and a differential piston valve located in the ports of said partitions and controlling flow through such ports, and having also a valve extension controlling flow through the said discharge passage of the sluice ring.

12. A duplex meter comprising in combination a meter casing and a valve casing, a meter within said meter casing, a second meter casing mounted upon said valve casing, a gasket between said second meter casing ing and said valve casing, means for securing said second meter casing to said valve casing, a second meter within said second meter casing, a sluice ring interposed between said second meter casing and the meter therein, on the one hand, and the said valve casing, on the other hand, such sluice ring seated in a shoulder of the valve casing beneath the said gasket, whereby said sluice ring is supported and centered independently of the gasket and of the means for securing said second meter casing to the valve casing, said valve casing having a discharge connection, said second meter and the sluice ring having together a discharge passage leading to the discharge passage of the valve casing, said valve casing having ported partitions in the path of flow from the first mentioned meter to the outlet passage of such valve casing, and a differential piston valve located in the ports of said partitions and controlling flow through such ports, said sluice ring having a valve port, in line with the valve ports of the said partitions of the valve casing, and said valve having a valve stem adapted in one position of the valve to enter and close the said port of the sluice ring.

13. A duplex meter comprising in combination a meter casing and a valve casing in communication therewith, the valve casing having a discharge passage, the meter casing having a meter therein, another meter casing mounted upon the valve casing and a further meter located within such second meter casing, such second meter having a discharge connection, a duct for leading fluid to the meter from the inlet side of the first mentioned meter casing to the second meter casing, and a unitary valve within said valve casing and controlling the flow from the first mentioned meter and having a valve stem adapted to pass through, to open and close, a port in the path of discharge from the second meter, and a member independent of the second meter and the casing therefor in which member such port is located.

14. In a meter, the combination with a rotor chamber, a head for such chamber comprising a socketed extension, a rotor within said chamber, a shaft upon which such rotor is mounted, said shaft extending through the said socketed extension, and a bearing bushing for said shaft located in said socketed extension and means for retaining such bearing bushing comprising an eccentric-headed screw, carried by the head of said rotor chamber, the head of said screw engaging a slot of said bearing bushing.

15. In a meter, the combination with a rotor chamber, of a rotor therein, a revolubly mounted rotor shaft for said rotor, bearings for said shaft, and a reducing gear train driven by said rotor shaft, and comprising a driving pinion, screw-connected to said rotor shaft and bearing at one end against a shoulder on such shaft, said shaft having further a cylindrical concentric extension which the bore of such pinion fits closely, by engagement with which cylindrical portion and with such shoulder the pinion is accurately centered with reference to said shaft.

16. In a meter, the combination with a rotor, a rotor shaft, bearings therefor, a gear-table, a support therefor, a gear train mounted on said table, the first member of which gear train is driven by said rotor shaft and is mounted concentrically thereon, and the final member of which gear train has its axis of rotation in line with the axis of rotation of said shaft, and a register-driving spindle arranged to be driven by such final gear member and also having its axis in line with the axis of said rotor shaft.

17. In a meter, the combination with a rotor, a rotor shaft, bearings therefor, a gear-table, a support therefor, a reducing gear train driven by said shaft and certain of the members of which have arbors having bearings in such table, and a step-bearing member carried by said gear table and forming a support and bearing-step for said arbors.

18. In a meter, the combination with a rotor chamber, a head for such chamber comprising an extended neck portion, a rotor within said chamber, a rotor shaft on which such rotor is mounted, said shaft extending through the neck portion of said head, a gear-table having a socket extension fitting over said neck, whereby said gear table is centered with respect to said rotor shaft, a gear train mounted upon said gear table, and driven by said rotor shaft and a register-driving spindle arranged to be driven by said gear train.

In testimony whereof I have signed this specification in the presence of two subscribing witnesses.

FRANK LAMBERT.

Witnesses:
H. M. MARBLE,
PAUL H. FRANKE,